(12) United States Patent
Asim et al.

(10) Patent No.: US 10,211,984 B2
(45) Date of Patent: Feb. 19, 2019

(54) HIERARCHICAL ATTRIBUTE-BASED ENCRYPTION AND DECRYPTION

(71) Applicant: KONINKLIJKE PHILIPS N.V., Eindhoven (NL)

(72) Inventors: Muhammad Asim, Eindhoven (NL); Tanya Ignatenko, Eindhoven (NL); Milan Petkovic, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1295 days.

(21) Appl. No.: 14/348,222

(22) PCT Filed: Sep. 21, 2012

(86) PCT No.: PCT/IB2012/055017
§ 371 (c)(1),
(2) Date: Mar. 28, 2014

(87) PCT Pub. No.: WO2013/046102
PCT Pub. Date: Apr. 4, 2013

(65) Prior Publication Data
US 2014/0229736 A1    Aug. 14, 2014

Related U.S. Application Data (60) Provisional application No. 61/540,033, filed on Sep. 28, 2011.

(51) Int. Cl.
*H04L 9/30* (2006.01)
*H04L 9/08* (2006.01)

(52) U.S. Cl.
CPC .............. *H04L 9/30* (2013.01); *H04L 9/088* (2013.01); *H04L 9/0836* (2013.01);
(Continued)

(58) Field of Classification Search
CPC ................... H04L 9/3247; G05B 2219/25205
See application file for complete search history.

(56) References Cited

U.S. PATENT DOCUMENTS

| | | |
|---|---|---|
| 5,315,657 A | 5/1994 | Abadi et al. |
| 5,481,613 A | 1/1996 | Ford et al. |

(Continued)

FOREIGN PATENT DOCUMENTS

WO    9528784 A1    10/1995

OTHER PUBLICATIONS

Bethencourt, J. et al, "Ciphertext-Policy Attribute-Based Encryption," Proceedings of the 2007 IEEE Symposium on Security and Privacy, pp. 321-334, 2007.

(Continued)

*Primary Examiner* — Arvin Eskandarnia (57) ABSTRACT

A domain authority 13 for use in a hierarchy of domain authorities in a hierarchical cryptographic system. The domain authority 13 comprises a user secret key generator 21 for generating a user secret key based on a domain secret key and one or more attribute representations, to obtain a user secret key associated with a set of attributes corresponding to the attribute representations, and wherein the domain secret key is based on a domain secret key of a parent domain authority or a root secret key of a root authority of the hierarchy of domain authorities, and wherein the attribute representations are independent of the hierarchy. A decrypter makes use of the user secret key. An encrypter generates ciphertext decryptable by the decrypter.

12 Claims, 4 Drawing Sheets

(52) U.S. Cl.
CPC .......... *H04L 9/0847* (2013.01); *H04L 9/3073* (2013.01); *H04L 2209/24* (2013.01)

(56) References Cited

U.S. PATENT DOCUMENTS

| | | | |
|---|---|---|---|
| 8,074,073 | B2 | 12/2011 | Gentry |
| 8,577,030 | B2 | 11/2013 | Takashima et al. |
| 8,892,902 | B2 | 11/2014 | Isozaki et al. |
| 2002/0062451 | A1* | 5/2002 | Scheidt .................. G06F 21/31 726/7 |
| 2005/0086514 | A1* | 4/2005 | Han .................. H04L 63/0823 726/26 |
| 2005/0193199 | A1* | 9/2005 | Asokan ................ H04L 63/062 713/168 |
| 2009/0080658 | A1 | 3/2009 | Waters et al. |
| 2010/0246827 | A1 | 9/2010 | Lauter et al. |
| 2012/0011360 | A1* | 1/2012 | Engels .................. H04L 9/006 713/166 |
| 2014/0229736 | A1 | 8/2014 | Asim et al. |

OTHER PUBLICATIONS

Gentry, C. et al. "Hierarchical ID-based cryptography". ASIACRYPT 2002, LNCS 2501, pp. 548-566.

Wang, G. et al. "Hierarchical Attribute Based Encryption for fine grained access control in cloud storage services," 17th ACM Conference on Computer and Communications Security, Oct. 4-8, 2010, Chicago.

Bonch, D. et al. "Hierarchical Identity Based Encryption with Constant Size Ciphertext," Eurocrypt 2005, vol. 3493 of Lecture Notes in Computer Science, pp. 440-456.

Goyal, V. et al. "Attribute-based encryption for fine-grained access control of encrypted data". CCS'06 proceedings of the 13th ACM conference on Computer and Communications Security, pp. 89-98 (2006).

Wang, G. et al. "Hierarchical attribute-based encryption and scalable user revocation for sharing data in cloud servers". Computers & Security, vol. 30, No. 5, May 14, 2011, pp. 320-331.

Li, J. "Enhancing attribute based encryption with attribute hierarchy". Communications and Networking in China, 2009, Chinacom 2009. Fourth International Conference on IEEE, NH, US. Aug. 26, 2009, pp. 1-5.

Chase, M. "Multi authority attribute based encryption", Feb. 21, 2007, TCC'07 Proceedings of the 4th conference on Theory of Cryptography: Lecture notes in Computer Science, pp. 515-534.

Akinyele, J.A. et al, "Self-Protecting Electronic Medical Records Using Attribute-Based Encryption". http://eprint.iacr.org/2010/565.pdf.

* cited by examiner

HIERARCHICAL ATTRIBUTE-BASED ENCRYPTION AND DECRYPTION

This application is a national stage application under 35 U.S.C. § 371 of International Application No. PCT/IB2012/055017 filed on Sep. 21, 2012 and published in the English language on Apr. 4, 2013 as International Publication No. WO/2013/046102, which claims priority to U.S. Application No. 61/540,033 filed on Sep. 28, 2011, the entire disclosures of which are incorporated herein by reference.

FIELD OF THE INVENTION

The invention relates to a hierarchical attribute-based cryptography system.

BACKGROUND OF THE INVENTION

An increasing need for data exchange among different parties involved in a care cycle ranging from traditional healthcare via home healthcare to wellness services has made secure management of digitally stored health data an important issue. Today's approaches are based on traditional security mechanisms complemented with physical and administrative procedures, limiting the availability of health information and making the exchange of health records cumbersome. Digital policy management and enforcement technologies may outperform these approaches by offering (1) end-to-end privacy and security in heterogeneous networks, protecting the data independently of the infrastructure over which data travels or institutional boundaries; (2) usage control on top of attribute-based access control mechanisms, which is very important in healthcare applications; and (3) simple interoperable security architecture that allows developing systems in a network agnostic way, obviating the need for network specific security provisions and hence reducing implementation and maintenance costs.

An important component of such a security system is the attribute-based encryption scheme (ABE), in particular a ciphertext-policy ABE scheme (CP-ABE), as known from J. Bethencourt, A. Sahai, and B. Waters, "Ciphertext-Policy Attribute-Based Encryption," Proceedings of the 2007 IEEE Symposium on Security and Privacy, pages 321-334, 2007. In this scheme the data is encrypted according to an access structure, also known as access control policy, so that only users with a suitable set of attributes can decrypt the data. To be able to decrypt the data, a user gets from the trusted authority a specific private key that corresponds to the set of attributes he/she has.

The known attribute based encryption schemes make use of a single root authority. This means that all users in the system obtain the secret keys related to their attributes from a central authority. However, in large and distributed organizations, this approach may be unpractical.

The hierarchical encryption scheme enables establishing the hierarchy of the organization, wherein some of the tasks are typically delegated to people further down in the hierarchy of the organization. The central authority will only issue the secret keys to the domain authorities. This will result in a reduction of the burden on the central authority and user convenience. Instead of contacting the central authority, users will contact their respective domain (or department) authorities to obtain their secret keys. An example of an identity-based hierarchical encryption scheme is disclosed in "Hierarchical ID-Based Cryptography", by C. Gentry et al., ASIACRYPT 2002, LNCS 2501, pp. 548-566, Springer-Verlag Berlin Heidelberg, 2002.

US 2010/0246827 A1 discloses a method relating to user-controlled encryption. In the system, the root key is derived from a secret (e.g. biometric, password) of the patient. This root key is then used to derive a set of decryption and encryption keys. These keys conform to a hierarchy. This hierarchy implicitly specifies the capabilities of the encryption and decryption keys. For example, a decryption key at a particular level in the hierarchy could decrypt only the document that is encrypted using the corresponding encryption key.

Guojun Wang, Qin Liu and Jie Wu, "Hierarchical Attribute-Based Encryption for Fine-Grained Access Control in Cloud Storage Services," 17th ACM Conference on Computer and Communications Security, Oct. 4-8, 2010. Hyatt Regency Chicago, Chicago, Ill., USA, discloses a hierarchical attribute-based encryption (HABE) model that combines a hierarchical identity-based encryption (HIBE) system and a ciphertext policy-attribute based encryption (CP-ABE) system, to provide access control and delegation. A HABE scheme is disclosed that makes a performance-expressivity tradeoff to achieve high performance. A domain master (DM) can be enabled to administer either the users of a domain or a disjoint set of attributes. The keys corresponding to an attribute are issued by the domain master administering that attribute. This approach has the following shortcomings: 1) The size of the ciphertext and decryption cost are dependent on the depth of the hierarchy and increase directly with the depth of the hierarchy. 2) During the encryption, the encrypter has to specify the respective domains and hierarchy, which means that if a new domain (e.g. Hospital) joins the network, the users from the newly joined member are not able to access already encrypted data even if they satisfy the access control policy.

Dan Boneh, Xavier Boyen, Eu-Jin Goh, "Hierarchical Identity Based Encryption with Constant Size Ciphertext," Cryptology ePrint Archive: Report 2005/015 (http://eprint.iacr.org/2005/015.pdf), discloses a hierarchical identity based encryption (HIBE) system where decryption is performed using two bilinear map computations, regardless of the hierarchy depth.

SUMMARY OF THE INVENTION

It would be advantageous to have an improved hierarchical attribute-based cryptographic system.

To better address this concern, a first aspect of the invention provides a cryptographic system including a hierarchy of domain authorities and a plurality of attributes assignable to a user, wherein a domain authority in the hierarchy comprises a user secret key generator for generating a user secret key based on a domain secret key and one or more attribute representations, to obtain a user secret key based on attribute representations for a set of the attributes assigned to a future owner of the key, the domain secret key being based on a domain secret key of a parent domain authority or a root secret key of a root authority of the hierarchy of domain authorities, and wherein the attribute representations are independent of the hierarchy.

The use of attributes that are independent of the hierarchy makes it possible for local domain authorities to issue keys for their users in accordance with any set of attributes that may be required for the users It is not necessary to contact any other domain masters that may be responsible for certain attributes which need to be assigned to this user, yet which are inaccessible to the domain authority issuing the user key.

Consequently, the proposed system allows true delegation of key generation in an attribute-based hierarchical cryptographic system.

The domain secret key may be referred to hereinafter as the original domain secret key, and the domain authority may be referred to as the original domain authority, in particular when discussing the generation of further domain secret keys by the original domain authority. This is only a matter of terminology; the adjective "original" does not refer to any particular property of the domain secret key or domain authority.

The original domain authority may comprise a domain secret key generator for generating a further domain secret key for a child domain authority in the hierarchy of domain authorities. This further domain secret key is generated based on the original domain secret key. In this way, the issuing of domain secret keys can be delegated to the individual domain authorities, and does not necessarily have to take place at root level. In this manner, a hierarchical system of domain authorities is created, in the sense that a root authority may generate domain secret keys for a first generation of domain authorities, i.e. level 1 domain authorities, and each domain authority of a generation of domain authorities may generate domain secret keys for a next generation of domain authorities. Thus, level 1 domain authorities may generate domain secret keys for level 2 domain authorities, and so forth.

The system may comprise public information including a public key relating to the hierarchy of domain authorities, and the further domain secret key for the child domain authority, i.e. a domain authority in the next generation of domain authorities, is based on a portion of this public key. Preferably, said portion of the public key has not yet been used in generating the original domain secret key. As the public key is related to the hierarchy, it follows that the portion of the public key is likewise independent of the attributes.

In this way, successive generations of domain authorities may be based on successively larger portions of the public key. This allows an encrypter to encrypt specifically for a subset of the generations, by applying an appropriate portion of the public key.

According to an aspect of the invention, a domain secret key for the child domain authority does not allow decryption of a ciphertext associated with the predecessors in the hierarchy. That is, if a ciphertext is associated with a level of the hierarchy that is higher than the level of the user, the ciphertext cannot be decrypted and read by that user.

By combining the new portion of the public key with the existing key information of the original domain secret key, it is possible to create a new domain secret key that cannot decrypt a ciphertext that was generated using only the portion of the public key associated with the predecessor generations in the hierarchy. This way, an additional discriminatory option is made available in addition to the attribute-based discrimination. This means that, apart from having an appropriate set of attributes, the user also needs a sufficiently high level in the hierarchy in order to be able to decrypt the ciphertext. At the same time, it is still possible to generate a ciphertext that can be decrypted by all generations in the system, as long as the policy associated with the ciphertext is satisfied.

The attribute representations, which are used for generating the user secret key associated with a set of attributes, may be publicly available to all domain authorities in the hierarchy. This allows any domain authority to generate a user secret key associated with any of the attributes. Moreover, the representations may be public to the entire system or to the world. This allows the same representations to be used by an encrypter for the encryption of messages.

The user secret key may comprise a first component representing a position in the hierarchy and a second component representing the set of attributes assigned to the user of the key, that is, the future owner of the key. The user secret key generator may be arranged for binding the first component and the second component by means of a random value. In this way, modification of the user secret key by a malicious user may be prevented. In other words, the first component is bound to the second component using a randomization factor in both parts. This has the effect that re-randomizing or modifying the user secret key invalidates the user secret key. Consequently, misuse by sharing the keys with other users is discouraged, because sharing of the key is only possible by sharing the unmodified user secret key, making the user traceable.

According to another aspect of the invention, the hierarchical attribute-based cryptographic system is provided with a decrypter. The decrypter is arranged for receiving a ciphertext associated with a policy over a plurality of attributes, wherein the ciphertext is further associated with at least part of a hierarchy of domain authorities; and decrypting the ciphertext based on a user secret key issued by a domain authority of said at least part of the hierarchy of domain authorities, wherein the user secret key enables decryption of the ciphertext if the set of attributes associated with the user secret key satisfies the policy of the ciphertext.

This allows the decrypter to obtain its user secret key directly from a domain authority. It is not necessary to contact a central authority, because the domain authority can be provided with full delegated power to generate the user secret key with the desired set of attributes, because the attributes are independent of the hierarchy.

According to an aspect of the invention, the user secret key does not allow decryption of a ciphertext associated with the predecessors in the hierarchy of the domain authority that issued the user secret key. This allows setting a group of users that may decrypt the ciphertext based on the level of the users in the hierarchy.

According to another aspect of the invention, the user secret key is associated with the level in the hierarchy of the domain authority that issued the user secret key, the level representing a number of predecessors in the hierarchy, wherein said at least part of the hierarchy of domain authorities consists of the domain authorities up to a predetermined level, and wherein the user secret key allows decryption of a ciphertext only if the level of the domain authority that issued the user secret key is lower than, or equal to, the predetermined level.

According to another aspect of the invention, the hierarchical attribute-based cryptographic system is provided with an encrypter; the encrypter may be arranged for encrypting a message based on public key information relating to at least part of a hierarchy of domain authorities and on a policy over a plurality of attributes, to obtain a ciphertext associated with the policy and said at least part of a hierarchy of domain authorities.

The encrypter thus can encrypt data in such a way that only users, to whom a set of attributes satisfying the policy have been assigned, can decrypt the data. The ciphertext need not be bound to a particular domain. In addition, it may be possible to associate the ciphertext with only a part of the hierarchy of domain authorities, thus enabling only eligible users within that part of the hierarchy to decrypt the data.

According to an aspect of the invention, said at least part of the hierarchy that is associated with the ciphertext comprises a root authority and a predetermined number of generations of descendants of the root authority. The descendants are domain authorities in the hierarchy of domain authorities that obtain their domain keys from their parents in the hierarchy. Generally, a generation is a set of domains at the same level in the hierarchy.

Thus selecting the part of the hierarchy allows encrypting a ciphertext for users below a particular level in the hierarchy. This can be useful, for example, if the hierarchy of domain authorities corresponds to an organizational hierarchy of users having increasingly higher privileges at lower levels. As the level of a user in the hierarchy decreases, the user may have a higher authorization level allowing the user to decrypt and read a larger number of messages.

In another aspect, the invention provides a method of generating a user secret key for use in a hierarchy of domain authorities in a hierarchical attribute-based cryptographic system, wherein the method comprises generating a domain secret key based on a domain secret key of a parent domain authority or a root secret key of a root authority of the hierarchy of domain authorities, and generating a user secret key based on a domain secret key and one or more attribute representations independent of the hierarchy of domain authorities, thereby obtaining a user secret key based on attribute representations for a set of the attributes assigned to a future owner of the key.

In another aspect, the invention provides a method of decrypting a ciphertext, comprising receiving a ciphertext associated with a policy over a plurality of attributes, wherein the ciphertext is further associated with at least part of a hierarchy of domain authorities; and decrypting the ciphertext, based on a user secret key issued by a domain authority of said at least part of the hierarchy of domain authorities, wherein the user secret key is associated with a set of the attributes;

wherein the decrypting of the user secret key is enabled only if the set of attributes associated with the user secret key satisfies the policy of the ciphertext.

In another aspect, the invention provides a method of encrypting a message, comprising encrypting a message based on public key information relating to at least part of a hierarchy of domain authorities and on one or more attribute representations, thereby obtaining a ciphertext associated with a policy over the attributes and said at least part of a hierarchy of domain authorities.

Another aspect of the invention provides a computer program product comprising instructions for causing a computer system to perform one or more of the methods set forth.

It will be appreciated by those skilled in the art that two or more of the above-mentioned embodiments, implementations, and/or aspects of the invention may be combined in any way deemed useful.

Modifications and variations of the image acquisition apparatus, the workstation, the system, the method, and/or the computer program product, which correspond to the described modifications and variations of the system, can be carried out by a person skilled in the art on the basis of the present description.

BRIEF DESCRIPTION OF THE DRAWINGS

These and other aspects of the invention are apparent from and will be elucidated with reference to the embodiments described hereinafter. Throughout the drawings, similar items are indicated by the same reference numerals. In the drawings.

DETAILED DESCRIPTION OF EMBODIMENTS

One of the use-case scenarios for the proposed schemes in the healthcare field could be when different hospitals and healthcare institutions join to form a national or regional connected healthcare network. Examples of such healthcare networks that have been formed in the past include NICTIZ in the Netherlands, NHS in UK, and InfoWay in Canada. For example, NICTIZ is a national electronic health record (HER) infrastructure in the Netherlands that allows healthcare providers, patients, healthcare insurance companies and the government to share healthcare related data. NICTIZ could act as a central authority in the proposed scheme while different institutions/organizations that have joined NICTIZ could act as domains that have their own domain/key authorities. The key authority of each member organization would then be issued one or more keys by the central authority of NICTIZ. The domain authorities can then use these keys to issue keys to their users according to the attributes of those users in their respective domains/organizations. In healthcare, the role of a user (Doctor, Nurse etc.) and other attributes are used as a basis to grant access to the patient's sensitive data.

The attribute based encryption schemes may allow an encrypter to encrypt sensitive data according to an access control policy over a list of attributes. In existing attribute-based cryptographic schemes users have to contact a central authority to get secret keys related to their attributes, which they can use to decrypt the data if they satisfy the relevant access control policy. However, such schemes put an extra burden on a central authority, because each user has to contact the central authority in order to get secret keys related to their attributes (in the example described above, healthcare workers in all member organizations would need to get their roles and other attributes from NICTIZ). In addition, this is also tedious for the user. In other words, the current attribute encryption schemes do not support hierarchy/workflows of the organizations in which usually users contact an intermediate authority, rather than the root (or top) authority.

In the proposed scheme, the burden on the setup or root authority is being lessened by allowing (sub-)domain authorities to issue keys to the users related to their attributes. The domain authorities can also issue keys further down to other users across the hierarchy, if they are allowed to do so. During the encryption it may not be necessary to specify a relevant domain. The encrypter only needs to encrypt the data according to the access control policy over a set of attributes. Consequently, it is not necessary to re-encrypt the data if a new domain (e.g. an additional healthcare organization) joins the system, as the data is not bound to a particular domain. The schemes disclosed herein may also have other advantages such as constant ciphertext size and decryption cost compared to the size of the hierarchy.

In the following, a number of exemplary embodiments are described. These embodiments are only presented as example implementations, and are not intended to limit the invention.

Figure 1:
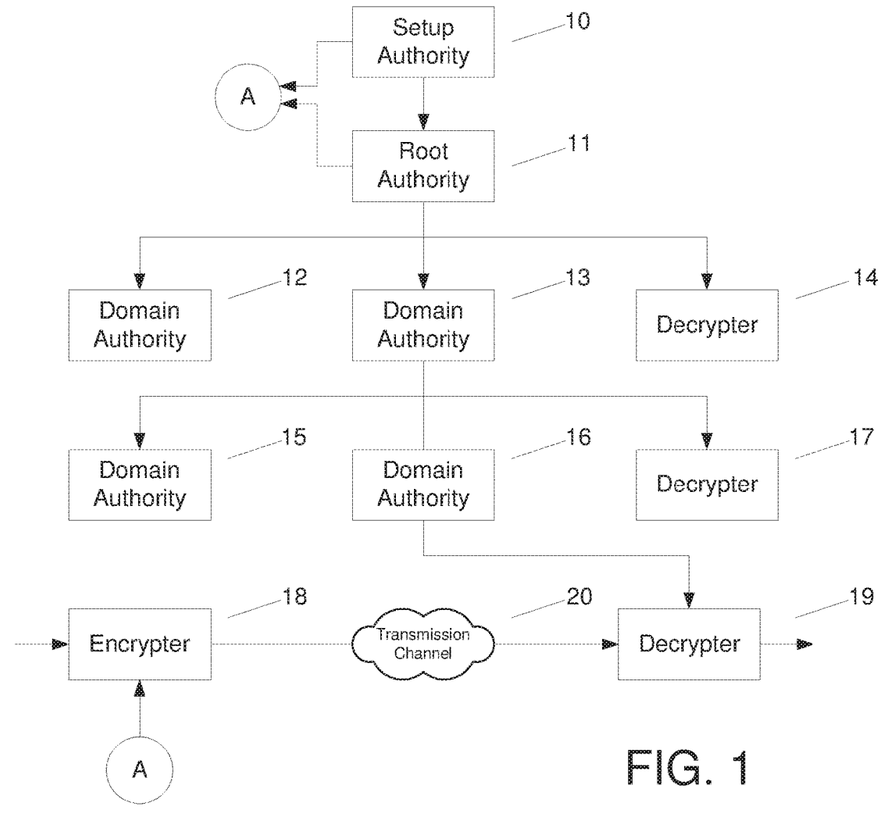
FIG. 1 is a diagram of a hierarchical attribute-based cryptographic system.

FIG. 1 shows a diagram of a hierarchical attribute-based cryptography system, that is, a cryptography system including a hierarchy of domains and a plurality of attributes assignable to a user.

The figure schematically shows a setup authority 10, a root authority 11, domain authorities 12, 13, 15, 16, decrypters 14, 17, 19, an encrypter 18, and a transmission channel 20. These objects may be implemented by separate devices. However, it is also possible to implement one or more of these entities as software modules that may run on any computer system. It is also possible to combine the functionality of several modules in a single piece of equipment. It is also possible to implement all modules, using a single server computer. Different users may then be provided access to the modules and keys for which they have the privileges. The system may also be implemented on a distributed computer system.

The setup authority 10 may be arranged for providing a number of general system parameters. Typically, the setup authority 10 determines a number of parameters that remain constant during the lifetime of the system. After these parameters have been fixed, the setup authority 10 may no longer be needed. The root authority 11 may provide the same functionality as the domain authorities 12,13,15,16. However, as the root authority 11 does not have a parent domain authority, the algorithms used may be slightly different. Domain authority 13 is shown in more detail in FIG. 2.

Figure 2:
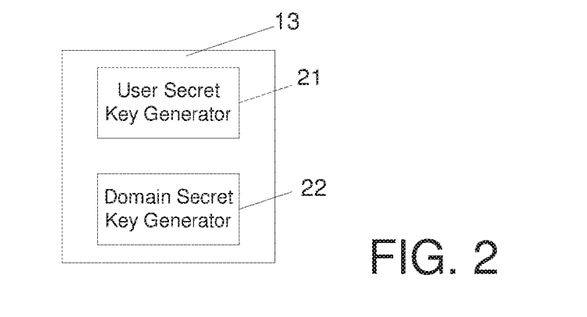
FIG. 2 is a diagram of a domain authority.

The domain authority 13 being described here in more detail is representative of the other domain authorities 12,15,16. Also, similar features may be found in the root authority 11.

The domain authority 13 is arranged for receiving a domain secret key from its parent authority. In this example, the parent authority of first-level domain authority 13 is the root authority 11. The parent authority of second-level domain authorities 15, 16 is first-level domain authority 13.

A domain secret key may be generated by the parent authority, based on the domain secret key of the parent domain authority, or based on the root secret key of the root authority of the hierarchy of domain authorities. In this example, the domain secret key of first-level domain authority 13 is generated by the root authority 11, and the second-level domain secret keys of domain authorities 15, 16 are generated by first-level domain authority 13.

The hierarchy of domain authorities may be viewed as a tree structure with the root authority at the top of the tree. The nodes of the tree are the domain authorities that receive their domain secret key from their predecessor in the tree. The decrypters 19 may be regarded as leaves of the tree.

The domain authority 13 may be responsible for generating domain secret keys. Additionally or alternatively, the domain authority 13 may be responsible for generating user secret keys. To this end, the domain authority 13 may comprise a domain secret key generator 22 and/or a user secret key generator 21.

Shown in FIG. 2, domain authority 13 comprises a user secret key generator 21. The user secret key generator 21 is arranged for receiving the domain secret key and one or more attribute representations. These attribute representations represents a set of attributes assigned to the future owner of the user secret key.

Generally, each attribute assignable to a user has a corresponding attribute representation that comprises data unique to that attribute. These attribute representations are independent of the hierarchy of domain authorities.

For example, the attribute representations are generated by the setup authority 10 or the root authority 11. The same representations may be used by all of the domain authorities. This does not exclude the possibility that representations are only used by a subset of the domain authorities. The user secret key generator 21 is arranged for generating a user secret key. This user secret key is generated based on the domain secret key of the domain authority 13 and the attribute representations corresponding to the set of attributes of a user, in particular, the attributes assigned to the user to whom the user secret key being generated will be allocated, i.e. the future owner of the key. The user secret key obtained is thus associated with a set of attributes corresponding to the attribute representations. Moreover, the hierarchical level and/or position of the domain authority are represented in the user secret key.

As will be understood from the above, a domain authority can generate a further domain secret key based on its own domain secret key. The latter domain secret key may be referred to hereinafter as the original domain secret key. The domain authority that generates a new domain secret key may be referred to hereinafter as the original domain authority. The domain authority that is capable of generating a further domain secret key comprises a domain secret key generator 22. The domain secret key generator 22 comprises an implementation of an algorithm for generating a domain secret key for a child domain authority in the hierarchy of domain authorities.

With reference to FIG. 1, for example, original domain authority 13 generates a further domain secret key for child domain authority 16. The further domain secret key of child domain authority 16 is generated based on the original domain secret key of original domain authority 13. Consequently, the generated domain secret key is for a domain authority representing an adjacent, child node in the hierarchical tree.

The domain secret key generator 22 may be arranged so that the further domain secret key for the child domain authority 16 is generated based on a portion of a public key of the hierarchy of domain authorities To this end, the public key may be divided into a number of components, and the original domain secret key is based on a subset of these public key components only.

To generate a child domain secret key, one or more additional public key components are used. The number of such public key components used may be related to the level of the domain authority within the hierarchy. Preferably, the additional public key component(s) used for generating the further domain secret key were not used in generating the original domain secret key.

Moreover, the portions of the public key that are used for generating the domain secret keys are independent of the attributes, and in particular of the attribute representations mentioned above. In this way, the domain secret keys are not limited to one or more particular attributes when a domain authority is generating user secret keys.

The further domain secret key for the child domain authority 16 does not allow decryption of a ciphertext associated with the predecessors, that is, root authority 11 and original domain authority 13, in the hierarchy. When encrypting, the encrypter may use only a subset of the above-mentioned portions of the public key. This means that the decrypter having a key based on more components, may not be able to decrypt the ciphertext. Such an effect may be achieved because the additional component used when generating the child domain secret key is combined with the original domain secret key in such a way that the corresponding public key component needs to be used for the ciphertext in order for the decrypter to be able to decrypt the data. This will be elaborated hereinafter in the detailed embodiments.

The domain authorities may be arranged for adding the components of the public key in the same order. This way, each "generation" of domain authorities has a domain secret key that is based on the same components of the public key. This allows encrypting data such that it can only be decrypted by user secret keys issued by a predetermined number of generations, also referred to as levels, of domain authorities.

It is possible that at least some of the attribute representations are publicly available to the domain authorities in the system. This allows these domain authorities to generate user secret keys associated with any selection of attributes, by generating secret key components based on the appropriate publicly available attribute representations.

The user secret key may comprise a first component representing a position in the hierarchy and a second component representing the set of attributes associated with the user secret key. However, the user secret key generator may be arranged for binding the first component and the second component by means of a random value. In this way, the modification of the user secret key by a malicious user may be prevented. An example implementation of this mechanism is described in the second detailed embodiment below.

Figure 5:
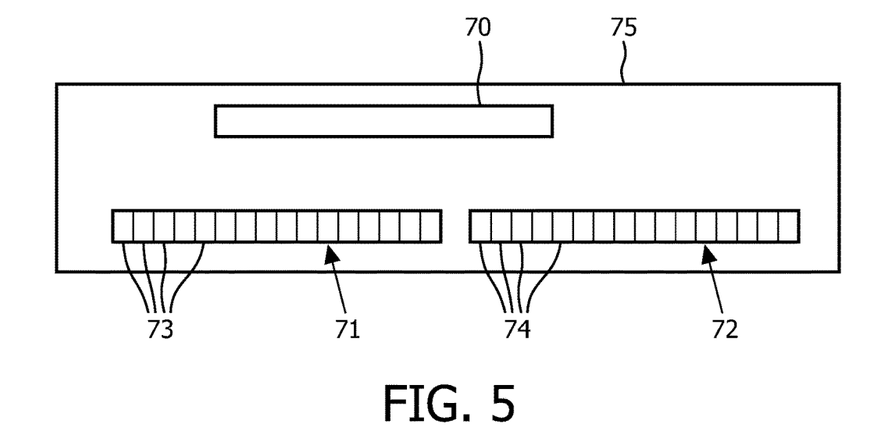
FIG. 5 is a diagram of public information in a hierarchical attribute-based cryptographic system.

FIG. 5 shows a diagram of the public information 75 in an embodiment of the cryptographic system according to the invention.

The public information 75 comprises public parameters 70 of the system. These public parameters 70 may include format information and, for example, field or group descriptors of groups used in the algorithms. For example, an order of a group may be specified as a parameter. The public information 75 further includes a public key 71 relating to the hierarchy of domain authorities. This public key 71 is divided into a plurality of public key components 73. The public information 75 further includes a portion 72 relating to attributes. This portion 75 comprises a plurality of attribute representations 74. These attribute representations may comprise, for example, public keys representing each attribute and/or public keys representing a subset of attributes.

Figure 6:
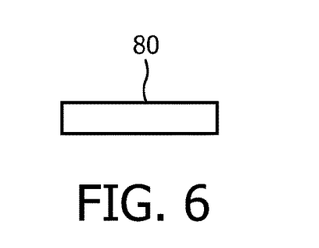
FIG. 6 is a diagram of a domain secret key.

FIG. 6 shows a diagram of a domain secret key 80.

Figure 7:
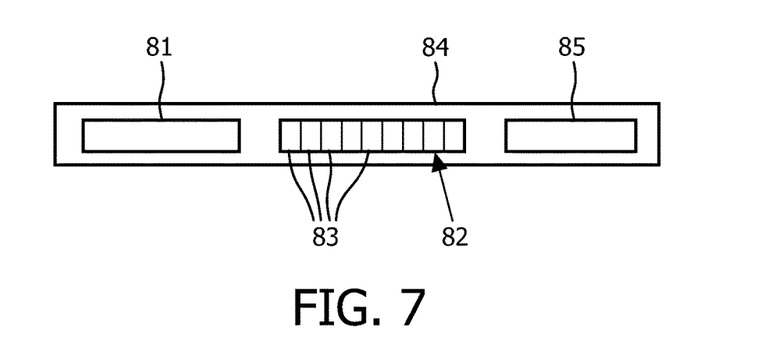
FIG. 7 is a diagram of a user secret key.

FIG. 7 shows a diagram of a user secret key 84. The user secret key 84 comprises a first component 81 relating to the hierarchy of domain authorities. A subset (or all) of the public key components 73 of the public key 71 relating to hierarchy may be used in order to generate this first component 81 of the user secret key 84

The user secret key 84 further comprises a second component 82 relating to the attributes associated with the user to whom the user secret key 84 will be assigned. The second component 82 comprises a plurality of subcomponents 83. Each subcomponent 83 may be based on one of the public attribute representations 74.

The user secret key may comprise any further components 85. These further components 85 are preferably independent of both hierarchy and attributes. More detailed examples of user secret key contents will be described hereinafter. Many variations are possible as to how the necessary information is represented in the user secret key.

A decrypter 19 may be employed, for example, by an end user of the system. This also applies to exemplary decrypters 14 and 17 positioned elsewhere in the hierarchy. The decrypter 19 may comprise a receiver for receiving a ciphertext from an encrypter 18 via a transmission channel 20. Such a transmission channel can comprise a digital communication means, such as email, Internet, or a removable storage medium such as an optical disc, for example. Moreover, the decrypter 19 may comprise a receiver for receiving a user secret key from a domain authority 16. The user secret key may be communicated from the domain authority, using any of the transmission means mentioned in this paragraph in respect of the ciphertext, for example. The ciphertext may be associated with a policy over the attributes that are available in the system. Moreover, the ciphertext may be further associated with at least part of the hierarchy of domain authorities 11,12,13,15,16. The decrypter may be arranged for decrypting the ciphertext, based on a user secret key issued by the domain authority 16. As described above, the user secret key may be associated with a set of the attributes that are available in the system.

The user secret key enables decryption of the ciphertext only if the set of attributes associated with the user secret key satisfies the access policy of the ciphertext. As describe above, the attributes are independent of the hierarchy. In this way, any domain authority 16 may be able to grant these attributes to its end users. This does not exclude the possibility that some other attributes may be restricted to some particular domain authority or authorities.

As described above, the user secret key may also be associated with the position in the hierarchy of the domain authority 16 that issued the user secret key. This position may be regarded as having a level indicative of a number of predecessors in the hierarchy. This number of predecessors can be counted, for example, by computing a shortest path from the domain authority to the root authority through the hierarchical tree. However, such counting typically is not performed in a running system, because the level is implicitly or explicitly represented by the contents of the user secret key.

As mentioned before, the ciphertext may be associated with at least part of the hierarchy of domain authorities. This part may consist of the domain authorities up to a predetermined level, as described above, i.e., the root authority, and generations of domain authorities up to the predetermined level. This can be achieved by the encrypter by using the corresponding components of the public key for encrypting.

The user secret key may allow decryption of the ciphertext only if the domain authority that issued the user secret key belongs to the domain authorities up to the predetermined level. This may be achieved by appropriately designing the user secret key and the ciphertext. However, the decryption algorithm is adapted accordingly in such a way that it allows decrypting the ciphertext using the user secret key. Detailed examples of appropriate decryption algorithms are given hereinafter.

The encrypter 18, in the example shown, is not part of the hierarchy. The encrypter may comprise a receiver for receiving a message to be encrypted. This message may originate from any source, such as a keyboard, a medical imaging device, a user application program, or via any kind of transmission channel. The encrypter 18 further may comprise a receiver for receiving public information from e.g. the setup entity 10 and/or the root authority 11. This public information may include the components of the public key relating to the hierarchy and/or the public attribute representations. All this information may be received by the encrypter or may be preconfigured during the manufacture thereof, for example.

The encrypter 18 may be arranged for encrypting a message, based on public key information relating to at least part of a hierarchy of domain authorities and a policy over a plurality of attributes, to obtain a ciphertext associated with the policy and said at least part of a hierarchy of domain authorities. As discussed above, the attributes are independent of the hierarchy. To this end, the public attribute representations of the attributes involved in the access policy are used to encrypt the data. Moreover, the components of the public key relating to the hierarchy are used to associate the ciphertext with said at least part of the hierarchy of domain authorities.

As described above, said at least part of the hierarchy may comprise the root authority and a predetermined number of generations of descendants of the root authority, wherein the descendants are domain authorities in the hierarchy of domain authorities that obtain their domain keys from their parents in the hierarchy.

Figure 3:
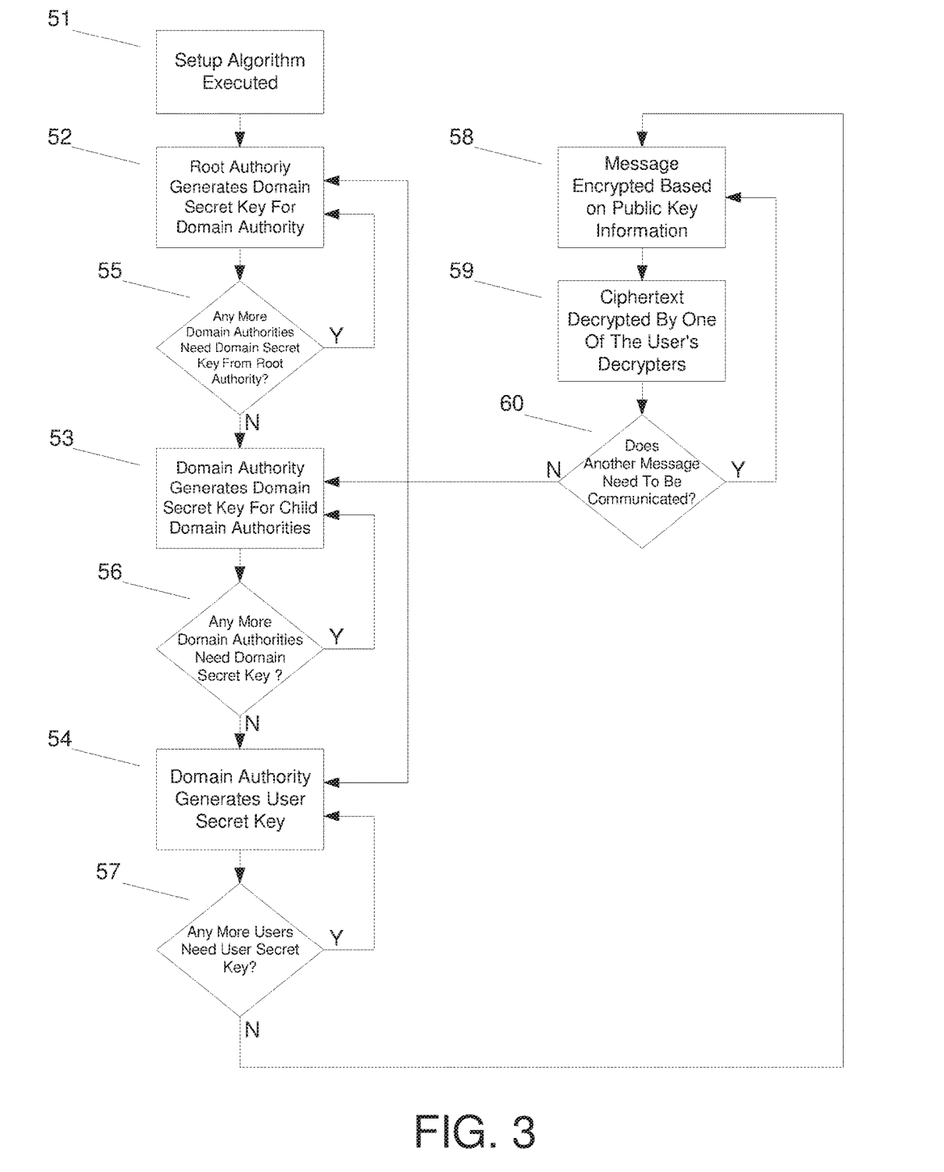
FIG. 3 is a flowchart of a method of hierarchical attribute-based cryptography.

A method of hierarchical attribute-based encryption is shown in FIG. 3. In step 51, a setup algorithm is executed, in order to establish a number of general parameters of the cryptographic system. These general parameters may relate to the format and size of ciphertext and plaintext, order and type of fields used in the encryption, etc. The general parameters may also include representations of attributes that are used in the system, as well as a public key having components that can be used to delegate the issuing of user secret keys to domain authorities.

In step 52, the root authority generates a domain secret key for a domain authority. This is based on the public key, using at least one of the components of the public key to generate the domain secret key. In step 55, it is determined whether any more domain authorities need a domain secret key from the root authority. If so, step 52 is repeated. In principle, the same component of the public key is used for every domain secret key generated by the root authority. However, this is not a limitation.

In step 53, a domain authority in the hierarchy of domain authorities generates a domain secret key for one of its child domain authorities in the hierarchy. This is done based on the original domain authority's original domain secret key and a yet unused portion of the public key relating to the hierarchy, that is, one or more public key components that were not used in generating the original domain secret key.

In step 56, it is determined whether another domain authority needs a domain secret key. If so, step 53 is repeated, in such a way that each original domain authority generates the domain secret keys for the domain authorities administered by the original domain authority.

In step 54, a domain authority in the hierarchy of domain authorities generates a user secret key based on its domain secret key and one or more attribute representations. This way, a user secret key is issued associated with a set of attributes corresponding to the attribute representations, in particular the attributes of a user to whom the user secret key will be assigned. The user secret key is further associated with the position of the domain authority in the hierarchy.

In step 57, it is determined whether another user needs a user secret key. If so, step 54 is repeated, in such a way that each domain authority generates the user secret keys for the users administered by that domain authority.

In step 58, a message is encrypted based on public key information (for example, public key components) relating to at least part of a hierarchy of domain authorities and a policy over a plurality of attributes, to obtain a ciphertext associated with the policy and said at least part of a hierarchy of domain authorities, wherein attribute representations are used that are independent of the hierarchy.

In step 59, the ciphertext is decrypted by one of the user's decrypters, based on his or her user secret key, wherein the user secret key is associated with a set of the attributes satisfying the policy, and wherein the user secret key enables decryption of the ciphertext if the set of attributes associated with the user secret key satisfies the policy of the ciphertext, and the user secret key was issued by a domain authority of said at least part of the hierarchy of domain authorities associated with the ciphertext.

In step 60, it is determined whether another message needs to be communicated. If so, steps 58 and 59 are repeated. When more keys are needed, the process may perform the relevant step. For example, when a new domain authority is added to the system, the process performs step 52 or 53 to generate a domain secret key for that domain authority. When a new user is added or the user's attributes change, the process may perform step 54 to generate a new user secret key. When no more actions are needed, the process ends.

It will be understood that one or more of these steps may be performed in parallel, for example by different entity's equipment or by a parallel processor. It will also be understood that the order of steps as described here is only an example; in practice, the order of execution of steps will vary according to the communication needs of the users. The method is suitable for being implemented in software, as a computer program product comprising instructions for causing a computer system to perform the method. In particular, computer program products may be devised that perform the steps needed to implement a particular entity, such as setup entity, root authority, domain authority, decrypter, encrypter. Other divisions of the software in modules are also possible.

A Hierarchical Attribute Based Encryption Scheme may comprise implementations of the following algorithms. Corresponding algorithms are found in existing ciphertext-policy attribute based encryption (CP-ABE) systems. This existing CP-ABE scheme may be extended as follows:

Setup: The setup algorithm configures system parameters during the initialization phase and outputs the public parameters PK and a master key MK. This algorithm is run by a root authority.

Key Generationroot auth. (MK, PK): This algorithm is run by the root authority to generate keys for the domain authorities. It takes as input MK and PK and outputs the secret keys dID|k=1 for the domain authorities which are at the level k=1. The domain authorities can use these keys to issue further keys to the users in their domains.

Key Generationdomain auth. (dID|k=1): This algorithm is run by the domain authorities. It takes as input the secret key dID|k=1 and outputs a user secret key dID|k+1. The user secret key comprises two parts, one part related to the hierarchy and another part related to the attributes possessed by the user. A domain authority can use the hierarchy part to issue further keys provided that the keys in question allow this (?).

Encryption (PK, M, A): The encryption algorithm takes as input the public key PK, a message M, and an access policy A over a universe of attributes. The algorithm returns the ciphertext CT. This ciphertext is constructed such that only users who have a secret key associated with an attribute set w that satisfies the access policy A can decrypt the ciphertext CT. The ciphertext CT implicitly contains a description of the access policy A.

Decryption (PK, CT, dID|k+1): The decryption algorithm takes as input public parameters PK, ciphertext CT, a secret key dID|k+1. It outputs a decrypted message M if dID|k+1 satisfies the access policy "A" that is implicitly represented by the ciphertext A. Otherwise, it returns an error symbol ⊥.

In one of the proposed schemes, a central authority (e.g. a central healthcare federation) issues keys to the domain authorities (a specific hospital or institution) under the central authority. The domain authorities can then use these keys to issue keys to the users which correspond to the user's attributes. Conceptually, the user key can be visualized as comprising two parts. One part relates to hierarchy while the other part relates to the attributes possessed by the user. The encrypter encrypts the data according to an access control policy over a set of attributes and does not need to bind the ciphertext to a particular domain/hierarchy. Functionalities of both a CP-ABE scheme and a hierarchical encryption scheme (such as hierarchical identity-based encryption scheme) may be combined. The encrypters do not need to specify the domains. The size of the ciphertext, as well as the decryption cost, may be independent of the hierarchy depth 'l'.

Figure 4:
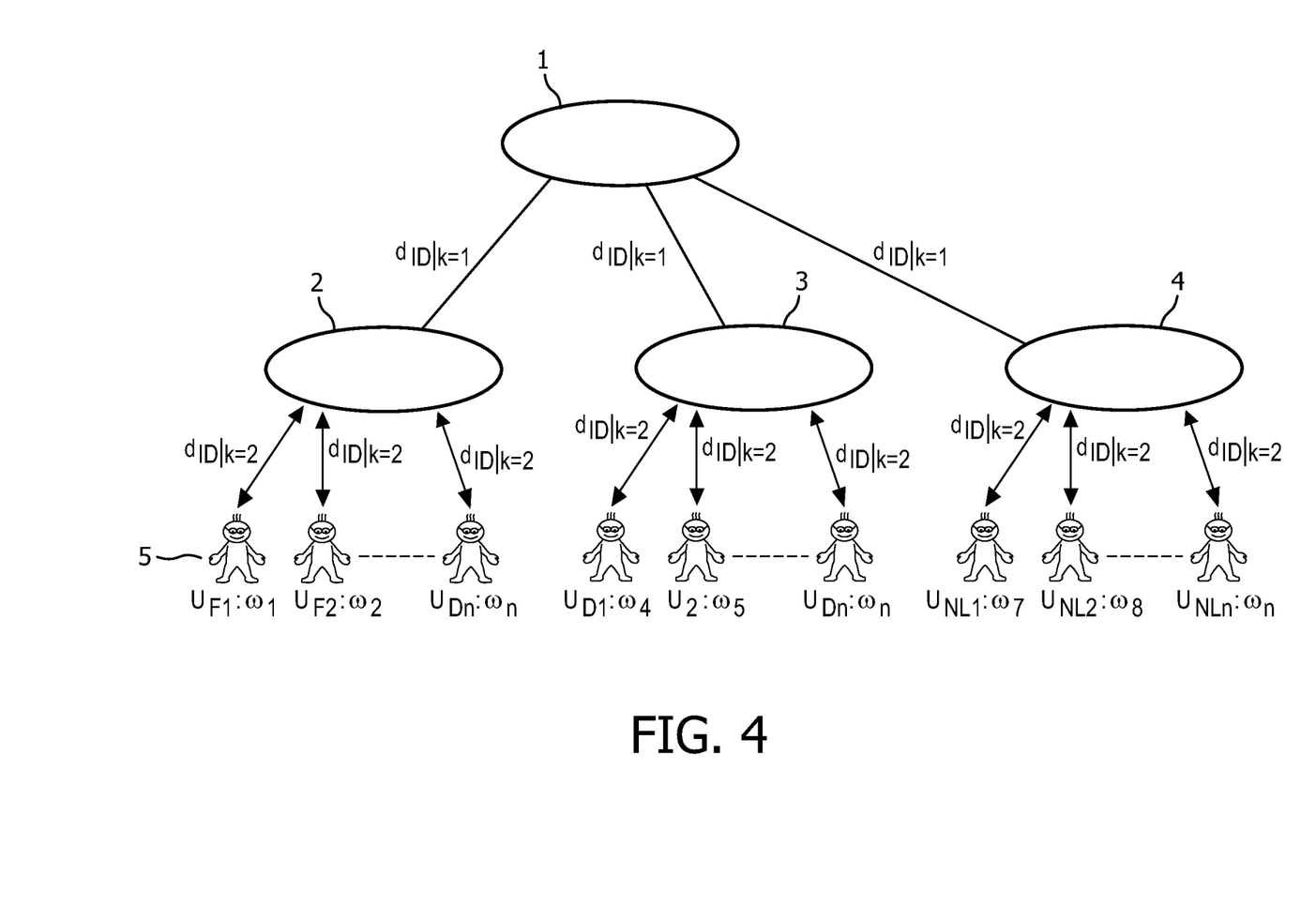
FIG. 4 is a diagram of entities involved in a hierarchical attribute-based cryptographic system.

FIG. 4 shows a conceptual diagram of an embodiment. In this system, a root authority 1 issues personalized keys ($d_{ID|k=1}$) to the domain authorities 2, 3, and 4. A domain authority 2 can use its key $d_{ID|k=1}$ to issue keys $d_{ID|k+1}$ to the users inside its domain. The user key $d_{ID|k+1}$ consists of two parts. One part is related to the hierarchy, while the other part is related to the attribute possessed by the user. The user can use the hierarchy part to act as a domain authority, by issuing keys to further users, if he is (?) allowed to do so.

In the following, a first exemplary embodiment of the invention is described in further detail. Let $G_0$ be a bilinear group of prime order p, and let g be a generator of $G_0$. In addition, let e: $G_0 \times G_0 \rightarrow G_1$ denote the bilinear map λ security parameter determines the size of the groups. The Lagrange coefficients $\Delta_{i,\omega}$, wherein $i \in \mathbb{Z}_p$, wherein $\mathbb{Z}_p = \{0, \ldots, p-1\}$, and wherein ω is a set of elements in $\mathbb{Z}_p$, are defined as follows:

$$\Delta_{i,\omega}(\kappa) = \prod_{j \in \omega, j \neq i} \frac{\kappa - j}{i - j}.$$

In addition, collision resistant hash functions $H_1: \{0,1\}^* \rightarrow G_0$ and $H_2: \{0,1\}^* \rightarrow \mathbb{Z}^*_p$ are used. Herein, $\{0,1\}^*$ denotes a binary sequence of arbitrary length, and $\mathbb{Z}^*_p = \mathbb{Z}_p \setminus \{0\}$. $H_1$ is a mapping that maps any attribute described as a binary string to a random group element in $G_0$, while $H_2$ is a mapping that maps a string representing an identity of an authority to $\mathbb{Z}^*_p$. In the following, examplary algorithms are described that may be used to implement a Hierarchical Attribute Based Encryption (HABE) Scheme.

1. Setup (λ, l):

This algorithm is run by the root authority to generate system parameters of an HABE of maximum depth l. It selects a random generator $g \in G_0$, selects $\alpha \in \mathbb{Z}, \beta \in \mathbb{Z}$ and sets $g_1 = g^\alpha$, $g_2 = g^\beta$. In addition, it picks random elements $g_3$, $h_1, \ldots, h_l \in G_0$. The public and secret parameters comprise the following components:

$PK=(g,g_3,h_1,\ldots,h_l,A), MK=(g_1,g_2),$ wherein $A=e(g, g)^{\alpha \cdot \beta}$.

2. Key Generation$_{RA}$ (MK, PK):

This algorithm is run in order to generate a private key $SK_{ID|k}$ for a domain authority at a depth $k \geq 1$, using master secret key MK and public key PK. It picks random $r \in \mathbb{Z}^*_p$ and outputs a key for a domain authority at the depth $k \leq l$. The value of r is unique for each domain authority. The private key $SK_{ID|k}$ is computed as follows:

$SK_{ID|k}=(g^\alpha \cdot (g^\alpha \cdot \Pi_{i=1}^k h_i)^r, g^r, h_{k+1}^r, \ldots, h_l^r, g^\beta) \in G_0^{3+l-k}.$ Herein, the symbol ID may be used as a label to distinguish the keys issued to different sub-authorities.

A private key $SK_{ID|k}$ for a domain authority at depth $1 < k \leq l$ can be generated in an incremental fashion, given the private key for the parent domain authority with private key $SK_{ID|k-1}$ in the hierarchy.

To this end, first, $a_0, a_1, b_k, \ldots, b_l$, and $c_0$ are defined as follows:

$SK_{ID|k-1}=(g^{\alpha_{k-1}} \cdot (g_3 \cdot \Pi_{i=1}^{k-1} h_i)^{r'}, g^{r'}, h_k^{r'}, \ldots, h_l^{r'}, g^\beta) =:$
$(a_0, a_1, b_k, \ldots, b_l, c_0).$ Herein, the symbol r' is the unique value r of the parent domain authority. In order to generate $SK_{ID|k}$, the system picks a random value $t \in \mathbb{Z}^*_p$ and outputs $SK_{ID|k}=(a_0 \cdot b_k \cdot (g_3 \cdot \Pi_{i=1}^k h_i)^t, a_1 \cdot g^t, b_{k+1} \cdot h_{k+1}^t, \ldots, b_l \cdot h_l^t).$ The private key $SK_{ID|k}$ may be perfectly distributed for r=r'+t. This means that if r' is selected randomly and t is also selected randomly and their distribution is (pseudo) random, then the distribution of r would also be (pseudo) random. To pick $r \in_R \mathbb{Z}^*_p$, the key generation algorithm may select a t randomly and set r=r'+t.

3. Attribute Key Generation$_{DA|k}$($SK_{ID|k}$, PK, ω):

This algorithm may be run by the domain authority at a depth $1 \leq k \leq l$ to generate a secret key $SK_{ID|k,\omega}$ for users having an attribute set ω. First, the algorithm selects a random value $r_u \in \mathbb{Z}_p$, then a random value $r_j$ for each attribute $j \in \omega$ and then computes and outputs $SK_{ID|k,\omega}$ as follows:

$SK_{ID|k,\omega}=(g^\alpha \cdot (g_3 \cdot \Pi_{i=1}^k h_i)^r, g^r, g^{\beta-r_u}, \forall j \in \omega: D_j, D'_j),$ wherein $\forall j \in \omega: D_j = g^{r_u} \cdot H_1(j)^{r_j}$ and $D'_j = g^{r_j}$.

4. Encryption (PK, M, τ, l):

This algorithm may be run by an encrypter to encrypt a message $M \in G_1$ under an access tree τ. The encrypted message CT can only be decrypted by a user whose key has a level $k \leq l$ and an attribute set ω such that ω satisfies the access tree τ. Conceptually, ciphertext CT comprises components related to three categories: 1) encrypted message, 2) components related to the hierarchy, and 3) access tree τ.

Let τ be a tree representing an access structure. Each non-leaf node of τ represents a threshold gate. A threshold gate may be described by its children nodes and a threshold value. Let $num_k$ be the number of children of a node κ and $k_\kappa$ be its threshold value, wherein $0 < k_\kappa \leq num_k$. If the threshold gate of node κ is an OR gate, then $k_\kappa = 1$. If the threshold gate of node κ is an AND gate, then $k_\kappa = num_k$. A leaf node κ may be described by an attribute and a threshold value, such as $k_\kappa = 1$.

In this paragraph, a few functions are defined. The function att(κ) is used to denote an attribute value associated with a leaf node κ in the access tree. This attribute value is a numeric value that represents a particular attribute. The parent of a node k in the access tree is denoted by parent(k). An ordering is also defined between the children of a node in the access tree. The children nodes are numbered 1 to num. In order to return such a value associated with a children node, we use the function (κ).

In order to represent the access tree, the encryption algorithm first chooses a polynomial $q_\kappa$ for each node $\kappa$ (including the leaves) in the access tree $\tau$. These polynomials may be chosen in the following way in a top-down manner, starting from the root node R. For each node $\kappa$ in the tree, the degree $d_\kappa$ of the polynomial $q_\kappa$ is set to be one less than the threshold value $k_\kappa$ of that node. That is, $d_\kappa = k_\kappa - 1$.

Starting with the root node R, the algorithm selects a random value s and sets $q_R(0)=s$. The value s is a secret value used for the purpose of threshold secret sharing. Then the algorithm selects $d_R$ other points of the polynomial $q_R$ randomly to define the polynomial completely. For any other node $\kappa$, it sets $q_\kappa(0)=q_{parent(\kappa)}(index(\kappa))$ and selects $d_\kappa$ other points randomly to completely define $q_\kappa$. Herein, index($\kappa$) is used to get access to a value of the node $\kappa$. Let Y be the set of all leaf nodes in the access tree $\tau$. The ciphertext CT is constructed by computing $$CT = (M \cdot A^s, g^s, (h_1 \ldots h_l \cdot g_3)^s, \forall y \in Y : g^{z y(0)}, H_1 (att(y))^{q_y(0)}) =: (\hat{C}, \hat{C}_0, \hat{C}_1, \forall y \in Y : C_y, C'_y),$$

wherein M is the message, and att(y) is the value of attribute y.

5. Decryption (CT, $SK_{ID|k,\omega}$):

The decryption algorithm takes as input the ciphertext CT and secret key $SK_{ID|k,\omega}$. The decryption algorithm comprises a recursive algorithm called D ecryptNode (CT, $SK_{ID|k,\omega}$, $\kappa$). Ciphertext CT may be regarded as implicitly containing a representation of the access tree $\tau$. Access tree $\tau$ is a representation of the access policy that prescribes which combinations of attributes are needed to decrypt the ciphertext CT.

Hereinafter, first, the recursive algorithm DecryptNode (CT, $SK_{ID|k,\omega}$, $\kappa$) will be defined for the case that $\kappa$ is a leaf node. Then, DecryptNode(CT, $SK_{ID|k,\omega}$, $\kappa$) will be defined for the case that $\kappa$ is a non-leaf node. After that, the function Decryption(CT, $SK_{ID|k,\omega}$) will be described that recovers the message M.

(a) Decrypt Node(CT, $SK_{ID|k,\omega}$, $\kappa$) for a Leaf Node $\kappa$:

In the first step, it starts with a leaf node $\kappa$ in $\tau$. Such a leaf node is associated with a real value representing an attribute. The function att($\kappa$) returns the real attribute value of the leaf node $\kappa$. Let i=att($\kappa$).
If i∈$\omega$ then $$DecryptNode(CT, SK_{ID|k,\omega}, \kappa) = \frac{e(D_i, C_\kappa)}{e(D'_i, C'_\kappa)}$$

$$= \frac{e(g^{r_u} \cdot H_1(i)^{r_i}, g^{q_\kappa(0)})}{e(g^{r_i}, H_1(i)^{q_\kappa(0)})}$$

$$= e(g, g)^{r_u q_\kappa(0)}$$

If i∉$\omega$, then DecryptNode(CT, $SK_{ID|k,\omega}$, $\kappa$)=⊥.

(b) Decrypt Node(CT, $SK_{ID|k,\omega}$, $\kappa$) for a Non-Leaf Node $\kappa$:

When $\kappa$ is an internal (non-leaf) node in $\tau$, the algorithm performs a recursive process. The algorithm proceeds as follows. For all nodes z that are children of $\kappa$, it calls DecryptNode(CT, $SK_{ID|k,\omega}$, z). The output thereof is used in order to determine whether the user has enough attributes to satisfy the policy. The output of DecryptNode(CT, $SK_{ID|k,\omega}$, z) is stored as $F_z$. Let $\omega_\kappa$ be an arbitrary $k_\kappa$-sized set of child nodes z such that $F_z \neq \bot$ for all z in the set of child nodes $\omega_\kappa$. Herein, $k_\kappa$ denotes the threshold value of a node.

If there is no such $k_\kappa$-sized set then the threshold value of node $\kappa$ was not satisfied and the function returns ⊥. Otherwise, if there is such a set, then DecryptNode computes the following:

$$F_\kappa = \Pi_{z \in \omega_\kappa} F_z^{\Delta_{i,\omega_\kappa'}(0)}, \text{ wherein } i = att(z) \text{ if } z \text{ is a leaf node and } \omega'_\kappa = i : z \in \omega_\kappa.$$

This way, $e(g, g)^{r_u \cdot q_\kappa(0)}$ is obtained, because $$F_\kappa = \prod_{z \in \omega_\kappa} F_z^{\Delta_{i,\omega_\kappa}(0)}$$

$$= \prod_{z \in \omega_\kappa} (e(g, g)^{r_u q_z(0)})^{\Delta_{i,\omega_\kappa}(0)}$$

$$= \prod_{z \in \omega_\kappa} (e(g, g)^{r_u q_{parent(z)}(index(z))})^{\Delta_{i,\omega_\kappa}(0)}$$

$$= \prod_{z \in \omega_\kappa} (e(g, g)^{r_u q_z(0)})^{\Delta_{i,\omega_\kappa}(0)}$$

$$= e(g, g)^{r_u \cdot q_\kappa(0)} (\text{using polynomial interpolation}).$$

This ends the definition of Decrypt Node(CT, $SK_{ID|k,\omega}$, $\kappa$).

To decrypt the ciphertext CT using the secret key $SK_{ID|k,\omega}$, the decryption algorithm proceeds as follows. First, the decryption algorithm calls the DecryptNode function on the root node R of the access tree $\tau$. If DecryptNode (CT, $SK_{ID|k,\omega}$, R) returns ⊥, it means that the access tree $\tau$ is not satisfied by the available set of attributes $\omega$ of the key $SK_{ID|k,\omega}$. In such a case, decryption is not possible. Otherwise, the access tree $\tau$ is satisfied by $\omega$. In such a case, the decryption algorithm sets $$Z^{(1)} = DecryptNode(CT, SK_{ID|k,\omega}, R) = e(g,g)^{r_u q_R(0)} = e(g,g)^{r_u s},$$

wherein $s = q_R(0)$.

Next, the decryption algorithm computes the following:

$$Z^{(2)} = e(g^{\beta - r_u}, g^s) \cdot Z^{(1)} = e(g,g)^{(\beta - r_u)s} \cdot e(g,g)^{r_u s} = e(g,g)^{\beta s}.$$

Next, the decryption algorithm computes $Z^{(3)}$ as shown below. Only the users at a level k with k≤l can recover the correct value of $Z^{(3)}$, which will help them in recovering the message M. The value $Z^{(3)}$ is computed as follows:

$$Z^{(3)} = \frac{e(g^s, g^\alpha \cdot (h_1 \ldots h_\kappa \cdot g_3)^r)}{e(g^r, (h_1 \ldots h_\kappa \cdot g_3)^s)}$$

$$= e(g, g_2)^{s\alpha}$$

Next, the decryption algorithm divides $Z^{(3)}$ by $Z^{(2)}$, resulting in $Z^{(4)}$:

$$Z^{(4)} = \frac{Z^{(3)}}{Z^{(2)}}$$

$$= \frac{e(g,g)^{\alpha s}}{e(g,g)^{\beta s}}$$

$$= e(g,g)^{(\alpha - \beta)s}.$$

Finally, the decryption algorithm computes $$\frac{\hat{C}}{Z^{(4)}}$$

to obtain the message M as follows:

$$\frac{\hat{C}}{Z^{(4)}} = \frac{M \cdot A^s}{Z^{(4)}}$$
$$= \frac{M \cdot A^s}{Z^{(4)}}$$
$$= \frac{M \cdot e(g, g)^{(\alpha-\beta)s}}{e(g, g)^{(\alpha-\beta)s}}$$
$$= M.$$

In the following, a second exemplary embodiment will be described. The second embodiment provides a solution to the problem of preventing that the users (including e.g. traitors) make their secret keys publicly available, e.g. by publishing them on the internet. In the above-described first embodiment, the users may be able to re-randomize their valid secret keys and then publish them. These re-randomized secret keys could be used by anyone to decrypt or view confidential information, such as medical records. A deterrence mechanism for preventing such acts may be provided.

This may be achieved by preventing users from re-randomizing their secret keys, as re-randomizing would render the secret keys useless. The users can only publish their keys in an original non-modified form. However, publishing the key in its non-modified form would allow the domain authorities who issued those keys or the central root authority to recognize the published key, and trace the original user of the key.

In the notation of the description of the second embodiment, a root authority issues secret keys $SK_k$ to domain authorities. The domain authorities can use key $SK_k$ to issue keys $SK_{P_k,\omega}$ to the users inside their domain. The user key $SK_{P_k,\omega}$ comprises two parts, one part related to the position in the hierarchy, while the other part is related to the attributes possessed by the user. The following exemplary algorithms may be used to implement the second embodiment.

1. Root Setup (K):
a) select $s_0$, $\alpha$, $\beta$, $\alpha \in Z_p$ and keep them secret;
b) select cryptographic hash functions $H_1: \{0,1\}^* \to G_1$ and $H_2: G_T \to \{0,1\}^n$;
c) set $A = e(g, g)^\alpha \cdot e(h_1, g)^{s_0}$.

The public parameters comprise $PK = (G_1, G_T, e, g, H_1, H_2, h_1, h_2, \ldots, h_t, g^{\alpha\beta})$.
The master secret key comprises $MK = (\alpha, a, \beta, s_0)$.

1. Lower Level Setup (k-1):
Domain authority at the level k-1 selects a random $s_{k-1} \in Z_p$ and keeps it secret.

2. Key Generation (PK, $\beta$, $g^\alpha$, $s_{k-1}$, w):
a) select $h_i$, this denotes the level of a domain authority in the hierarchy;
b) set $SK_k = SK_{k-1} \cdot h_i^{s_{k-1}} = g^\alpha (\prod_{l=1}^{i} h_l^{s_{l-1}})$. This is the key for the domain authority at level k which can be used to issue further secret keys to users. Here the key for the root authority is $SK_1 = g^\alpha h_1^{s_0}$. The users' secret keys are associated with their attributes;
c) select $r_u \in Z_p$ and set $SK_{P_k,\omega}$ to be:

$$\left(D^{(1)} = g^{ar_u} \cdot SK_k = g^\alpha g^{ar_u}\left(\prod_{l=1}^{k} h_l^{s_{l-i}}\right), D^{(2)} = g^{\frac{r_u}{\beta}},\right.$$

$$\left.\forall a_j \in \omega: D_j^{(3)} = H_1(a_j)^{\frac{r_u}{\beta}}, \forall l, 1 \le l \le k-1: Q_l = g^{s_l}\right).$$

1. Encryption (PK, $\tau$):
a) select a random $s \in Z_p$;
b) set the ciphertext C to be:

$$C = (g^s, h_2^s, \ldots, h_t^s, M \oplus H_2(A^s), \forall a_j \in \tau: g^{a\beta}$$
$$\forall H_1(a_j)^{-s}) = (U_0, U_2, \ldots, U_t, V, \forall a_j \in \tau: V_{a_j}),$$

wherein $\bar{s}_j$ is a share of s computed using for example an additive secret sharing method. Further details of the secret sharing method are omitted here for the sake of clarity. These details may be filled in by the skilled person based on this description and his or her knowledge of secret sharing methods.

1. Decryption ($SK_{P_k,\omega}$, C):
Assumption: Let $\omega$ satisfy the access structure $\tau$.

a) compute $Z^{(1)} = \prod_{a_j \in \omega} e(V_{a_j}, D^{(2)}) \cdot e(U_0, D_j^{(3)})$
$$= e(g, g)^{asr_u};$$

b) compute $Z^{(2)} = H_2\left(\frac{e(g^s, D^{(1)})}{(\prod_{l=2}^{k} e(Q_{l-1}, U_l)) \cdot Z^{(1)}}\right);$ c) recover $M = V \oplus Z^{(2)}$.

The following table of symbols applies to the description of the second embodiment.

| | |
|---|---|
| $a_j$ | an attribute possessed by a user |
| $\omega$ | a set of attributes possessed by a user |
| $P_k$ | party $P_k$ |
| k | An index used to indicate the level of a domain authority in the hierarchy |
| t | the maximum number of levels in a hierarchy |
| $h_k$ | an identifier for the domain authorities at level k |
| $r_u$ | a probabilistically unique random value for each user u, $r_u \in Z_p$ |
| $x_j$ | a unique random value related to each attribute $a_j$ |
| j | an index of an attribute |
| $G_1$ | cyclic group $G_1$ |
| $G_T$ | target group $G_T$ |
| e | an admissible bilinear map e: $G_1 \times G_1 \to G_T$ |
| g | a generator for the cyclic group $G_1$ |
| $s_0$ | a secret for the root authority |
| $s_k$ | a secret selected by the domain authority at level k |
| $\bar{s}_j$ | a share of secret s |
| $SK_k$ | a secret key for the domain authority at level k |
| K | a security parameter |
| $\tau$ | an access structure |
| $SK_{P_k,\omega}$ | a secret key of party $P_k$ related to the attribute set $\omega$. |

It will be appreciated that the invention also applies to computer programs, particularly computer programs on or in a carrier, adapted to put the invention into practice. The program may be in the form of a source code, an object code, a code intermediate source and object code such as in a partially compiled form, or in any other form suitable for use in the implementation of the method according to the invention. It will also be appreciated that such a program may have many different architectural designs. For example, a program code implementing the functionality of the method or system according to the invention may be subdivided into one or more sub-routines. Many different ways of distributing the functionality among these sub-routines will be apparent to the skilled person. The sub-routines may be stored together in one executable file to form a selfcontained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a flash drive or a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or to be used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A cryptographic system comprising:
a memory storing computer-executable instructions; and
a processor configured to execute the instructions to generate:
a hierarchy of domain authorities; and
a plurality of attributes assignable to a user,
wherein a domain authority in the hierarchy comprises:
a user secret key generator for generating a user secret key for the user based on a domain secret key and one or more attribute representations comprising public key information representing a set of the attributes assigned to the user, the domain secret key being based on:
a) a domain secret key of a parent domain authority of the domain authority in the hierarchy, or
b) a root secret key of a root authority of the hierarchy of domain authorities,
wherein the attribute representations are independent of the hierarchy of domain authorities.

2. The cryptographic system of claim 1, wherein the domain authority is an original domain authority having an original domain secret key, wherein the processor further generates:
a domain secret key generator for generating a further domain secret key for a child domain authority in the hierarchy of domain authorities, the further domain secret key being based on the original domain secret key.

3. The cryptographic system of claim 2, wherein the processor further generates public information including a public key relating to the hierarchy of domain authorities, and wherein the further domain secret key for the child domain authority is based on a portion of the public key, said portion not having been used in generating the original domain secret key and being independent of the attributes.

4. The cryptographic system of claim 2, wherein the further domain secret key for the child domain authority is arranged so as not to allow decryption of a ciphertext associated with predecessors in the hierarchy of domain authorities.

5. The cryptographic system of claim 1, wherein at least some of the attribute representations are publicly available to one or more of the domain authorities in the hierarchy.

6. The cryptographic system of claim 1, wherein the user secret key comprises:
a first component representing a position in the hierarchy of domain authorities, and
a second component representing the set of attributes assigned to the user,
wherein the user secret key generator is arranged for binding the first component and the second component by means of a random value.

7. The cryptographic system of claim 1, wherein the processor further generates a decrypter arranged for:
receiving a ciphertext associated with a policy over a plurality of the attributes, wherein the ciphertext is further associated with at least part of the hierarchy of domain authorities; and
decrypting the ciphertext based on a user secret key issued by a domain authority of said at least part of the hierarchy of domain authorities,
wherein the user secret key enables decryption of the ciphertext if the set of attributes corresponding to the user secret key satisfies the policy of the ciphertext.

8. The cryptographic system of claim 7, wherein the user secret key is associated with a level in the hierarchy of the domain authority that generated the user secret key, the level representing a number of predecessors in the hierarchy,
wherein said at least part of the hierarchy of domain authorities consists of the domain authorities up to a predetermined level in the hierarchy, and wherein the user secret key allows decryption of a ciphertext only if the level of the domain authority that generated the user secret key is lower than, or equal to, the predetermined level.

9. The cryptographic system of claim 7, wherein said at least part of the hierarchy comprises a root authority and a predetermined number of generations of descendants of the root authority.

10. The cryptographic system of claim 1, wherein the processor further generates an encrypter arranged for:
  encrypting a message, based on public key information relating to at least part of the hierarchy of domain authorities and on one or more attribute representations to obtain a ciphertext associated with a policy over the attributes and said at least part of a hierarchy of domain authorities.

11. A method of generating a user secret key for use in a hierarchical attribute-based cryptographic system comprising a hierarchy of domain authorities and a plurality of attributes assignable to a user, the method comprising:
  generating a domain secret key for a domain authority in the hierarchy based on:
    a) a domain secret key of a parent domain authority of the domain authority in the hierarchy, or
    b) a root secret key of a root authority of the hierarchy of domain authorities; and
  generating a user secret key for the user based on the domain secret key and one or more attribute representations comprising public key information representing a set of the attributes assigned to the user,
wherein the attribute representations are independent of the hierarchy of domain authorities.

12. A non-transitory computer readable medium comprising instructions for causing a processor to perform a method according to claim 11.

\* \* \* \* \*